United States Patent Office 2,996,426
Patented Aug. 15, 1961

2,996,426
PESTICIDAL COMPOSITION
Arthur L. Galloway, Richmond, Va., assignor to Diamond Alkali Company, Cleveland, Ohio, a corporation of Delaware
No Drawing. Filed Apr. 28, 1958, Ser. No. 731,104
14 Claims. (Cl. 167—42)

This invention relates to biologically active, halogenated paraffin-containing compositions and to the preparation and utilization of such compositions.

The prior art describes numerous biologically active compositions including both liquid and dry mixtures or formulations useful as pesticides generally, such as, insecticides, nematocides, fungicides, bactericides, miticides, tickicides, herbicides, and the like.

In many instances, these prior compositions, which utilize various toxicant materials such as DDT [1,1,1-trichloro-2,2'-di(p-chlorophenyl) ethane], parathion [O,O-diethyl-O-p-nitrophenyl phosphorothioate], malathion [S-(1,2-dicarbethoxyethyl)-O,O-dimethyl phosphorodithioate], endrin [1,2,3,4,10,10-hexachloro-exo-6,7-epoxy-1,4,4a,5,6,7,8,8a - octahydro - 1,4,5,8-endo,endo-dimethanonaphthalene], dieldrin [1,2,3,4,10,10-hexachloro-exo-6,7-epoxy - 1,4,4a,5,6,7,8,8a - octahydro - 1,4-endo,exo-4,8-dimethanonaphthalene], DDVP [dimethyl dichlorovinyl phosphate], ovex or ovatran [4-chlorophenyl-4-chlorobenzene sulfonate], lindane [benzene hexachloride, 99% gamma isomer] and the like, have been satisfactory.

In other applications however, despite the usefulness and effectiveness of such materials containing toxicants of the foregoing type, there have been instances wherein the full effectiveness of the toxicant has not been realized in practice. At times this failure to achieve full effectiveness may, of course, be due to improper preparation, handling, application, or the like. However, in many instances, this loss in effectiveness is attributable to a volatilization loss or to inactivation of the toxicant materials; while in still other instances it is believed due, in part at least, to decomposition of the active toxicant ingredients.

Accordingly, prior workers in the art have sought to render more resistance to decomposition by volatilization, and the like, biologically active compositions heretofore employed. However, up to the present time their efforts have not yet provided a generally useful solution to the problem of retaining or enhancing effectiveness of biologically active materials in practical application which, of course, is of primary importance if proper utilization of such materials is to be achieved.

Accordingly, the principal object of the present invention is to provide new and improved biologically active compositions, formulations or the like, characterized by a high degree of stability and toxicant effectiveness.

A further object of this invention is to provide improved biologically active compositions which are more resistant to volatilization.

These and other objects and advantages of the invention will more fully appear from the following description thereof.

The present invention includes biologically active compositions which contain in addition to at least one essential active ingredient, a stabilizing amount of a water insoluble halogenated paraffin, e.g., a fluorinated paraffin, brominated paraffin, iodinated paraffin or, preferably, a chlorinated paraffin, a chlorinated paraffin wax.

The expression "chlorinated paraffin" as used in the specification and claims is intended to refer to a highly chlorinated organic material, preferably a highly chlorinated paraffin containing between about 40% and about 80% by weight of chemically combined chlorine. Such materials can be prepared by chlorinating, in a solvent such as carbon tetrachloride, a petroleum-derived or other paraffin wax containing from about 18 to 36 carbon atoms in a straight or branched chain and suitably a paraffin wax which averages on the order of 24 carbon atoms. Waxes of this general class are known to melt in a temperature range of about 48° to 68° C., preferably 51° to 55° C. as indicated above, the content of chemically combined chlorine may range from about 40% to 80%.

In those instances where a liquid additive is desired, a chlorine content of about 40% is preferred; where a solid additive is required, a higher chlorine content, generally greater than 50% and typically around 65% to 75% is preferred.

The terms "toxicant" and "active ingredient" as employed throughout the specification and claims are intended to refer to various pesticides, such as insecticides, nematocides, fungicides, bactericides, tickicides, miticides, herbicides, and the like, as well as mixtures thereof. Illustrative of such materials are the aforementioned malathion, parathion, dieldrin, endrin, DDT, DDVP, lindane, as well as conventional inorganic pesticide substances.

In addition to the toxicant or mixture of toxicants and the halogenated paraffin, in accordance with this invention, other inert additives also may be present in the composition such as finely-divided, i.e., liquid or solid, diluents, extenders, fillers, and the like, e.g., clays (Attaclay), bentonite (Wyoming bentonite), pyrophyllite, diatomaceous earth, soil, water, organic liquids such as kerosene, various petroleum fractions, oils, acetone, xylene, toluene, and the like. For convenience, such a material is referred to in the claims as a "carrier."

It also will be appreciated, of course, that various surface active agents, or organic wetting agents, desirably can be incorporated in formulating emulsifiable concentrates and the like. Illustrative of suitable surface active agents are Triton X-155 (alkyl aryl polyether alcohol), alkyl aryl sulfonates (sodium dodecyl benzene sulfonate), alkyl aryl polyether alcohols, e.g., polyoxyethylene sorbitan monolaurate, and the like.

It will be appreciated, of course, that the specific formulations to be employed, as well as the proportions to be used, in accordance with this invention vary as diversely as do the toxicants and applications intended. However, it generally is desirable to utilize a biologically active composition which contains at least 40% by weight of the total composition of a carrier, an effective amount, depending upon the particular activity intended, material employed and the like, of a toxicant and a suitable stabilizing proportion of a halogenated paraffin, suitably a chlorinated paraffin wax in an amount of up to 50% by weight of the total composition, preferably about 5% to 35% by weight of the total composition.

In order that those skilled in the art may better understand the nature of the compositions of the present invention and in what manner the same may be used, the following examples are offered.

EXAMPLE I

To illustrate the effectiveness of chlorinated paraffin waxes in combination with various insecticidal formulations and to demonstrate the synergistic effect produced by their use, a series of tests are conducted against the Mexican bean beetle using known insecticides in formulations both with and without a chlorinated paraffin wax additive. In these tests, seed leaves of bean plants growing in 2½ inch clay pots are treated by dipping the leaves into a test formulation comprising an aqueous mixture of the toxicant alone or in combination with a chlorinated paraffin wax. Each formulation is tested at dosages of 4000, 2000 and 1000 p.p.m. of the active ingredient one day after treatment by exposing each of the two seed leaves to ten fourth instar bean beetle larvae.

Insect mortality is determined three days after exposure. The plants are held at a 16-hour fluorescent light day at an intensity of about 1000 ft. candles and a temperature of 82° to 88° F. The results of such tests, indexed comparatively, are as follows:

Table I

| Test | Test Formulation | Concentration, p.p.m. Active Ingredient | Insect Mortality |
|---|---|---|---|
| A | 25.0% chlorinated paraffin wax containing 40% chemically combined chlorine. 7.5% Triton X-155*. 67.5% xylene. | 2,000 1,000 | 5 0 |
| B | 26.1% tech. Malathion (96%). 7.5% Triton X-155*. 66.4% xylene. | 2,000 1,000 | 90 75 |
| C | 26.1% tech. Malathion (96%). 25.0% chlorinated paraffin wax containing 40% chemically combined chlorine. 7.5 Triton X-155*. 41.4% xylene. | 2,000 1,000 | 100 100 |
| D | 25.3% tech. DDVP. 7.5% Triton X-155*. 67.2% xylene. | 1,000 | 0 |
| E | 25.3% tech. DDVP. 25.0% chlorinated paraffin wax containing 40% chemically combined chlorine. 7.5% Triton X-155*. 42.2% xylene. | 1,000 | 30 |

*Triton X-155 is an alkyl aryl polyether alcohol, e.g., disclosed in U.S. Patent 2,504,064.

As can be seen by comparing A and B with C and A and D with E, the result of the combination of the chlorinated paraffin wax and the insecticide is not merely additive of the results obtained when using each separately, thus showing that a synergism results from the combination.

EXAMPE II

Tests are conducted against growing cotton using known insecticides against the boll weevil in formulations containing a chlorinated paraffin wax. Results of such tests carried out in actual field growing conditions using a dust consisting of 5.07% technical DDVP, 5.07% chlorinated paraffin wax containing 40% chemically combined chlorine, 88.18% Attaclay and 1.68% Wyoming bentonite result in a season average boll weevil count of 67.3 as compared to an untreated check average season count of 71.2.

Moreover, using such a dust a yield/acre of 1898 pounds of seed cotton is obtained as compared to an untreated check yield/acre of but 1630 pounds.

These results and the yield/acre values obtained using the same procedure but with other known insecticides are tabulated as follows:

Table II

| Test Formulation | Yield/acre of Seed Cotton, lbs. |
|---|---|
| DDVP—chlorinated paraffin wax | 1,898 |
| Endrin spray (0.2 lbs./acre) and Malathion at 0.5 lbs./acre | 1,774 |
| Untreated | 1,630 |

EXAMPLE III

Tests are conducted against the codling moth in apple orchards. In these tests, formulations of known insecticides are applied as aqueous sprays using the following formulations:

Table III

| Test | Test Formulation |
|---|---|
| A | 15.15% technical DDVP (99%). 15.15% chlorinated paraffin wax containing 40% chemically combined chlorine. 5.00% Bentonite. 64.7% Attaclay. |
| B | 15.15% technical DDVP (99%). 5.00% Wyoming Bentonite. 79.85% Attaclay. |

Using the above formulations in comparative tests on McIntosh apple trees in a growing season in the State of New York at a concentration of 1½ lbs./gal. (increased to 3 lbs./100 gal. in the fourth spray), using a total of 6 cover sprays throughout the season, it is observed that in replicated samples, a total injury of only 3.39% is observed due to the codling moth in those trees sprayed with formulation A containing the chlarinated paraffin wax; while trees sprayed with the identical mixture minus chlorinated paraffin wax, i.e., formulation B, show a total injury of 8.4% or more than twice that observed when a chlorinated paraffin wax is contained in the spray material. Trees in an untreated check showed an injury of 59.07%.

EXAMPLE IV

Using the same formulations of Example III, against the red-banded leaf roller at the same concentrations, it is observed that with the chlorinated paraffin wax containing formulation, a total injury of only 2.21% is observed while use of the same material minus the chlorinated paraffin wax leads to an injury of 6.33% or more than 3 times that of the chlorinated paraffin wax containing formulations.

While there have been described various embodiments of the invention, the methods and products described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A biologically active composition comprising, as an essential active ingredient, a pesticidal material selected from the group consisting of 1,1,1-trichloro-2,2'-di(p-chlorophenyl)ethane; O,O - diethyl-O,P-nitrophenyl phosphorothioate; S - (1,2-dicarbethoxyethyl) - O,O - dimethyl phosphorodithioate; 1,2,3,4,10,10 - hexachloro - exo-6,7-epoxy - 1,4,4a,5,6,7,8,8a - octahydro - 1,4,5,8 - endo,endo-dimethanonaphthalene; 1,2,3,4,10,10 - hexachloro - exo-6,7 - epoxy - 1,4,4a,5,6,7,8,8a - octahydro - 1,4-endo,exo-4,8 - dimethanonaphthalene; dimethyl dichlorovinyl phosphate; 4 - chlorophenyl - 4 - chlorobenzene - sulfonate; and benzene hexachloride, and a stabilizing amount of a water insoluble halogenated paraffin wax having 18–36 carbon atoms in the molecule thereof and containing 40–80% by weight of chemically combined halogen.

2. The composition as claimed in claim 1 wherein the halogenated paraffin wax is a chlorinated paraffin wax containing about 40% by weight of chemically combined chlorine.

3. A biologically active composition comprising a finely-divided mixture of a pesticidal material selected from the group consisting of 1,1,1-trichloro-2,2'-di(p-chlorophenyl)ethane; O,O - diethyl - O - p - nitrophenyl phosphorothioate; S - (1,2 - dicarbethoxyethyl) - O,O - dimethyl phosphorodithioate; 1,2,3,4,10,10 - hexachloro - exo - 6,7 - epoxy - 1,4,4a,5,6,7,8,8a - octahydro - 1,4,5,8-endo,endodimethanonaphthalene; 1,2,3,4,10,10 - hexachloro-exo-6,7-epoxy-1,4,4a,5,6,7,8,8a - octahydro - 1,4-endo-exo-4,8-dimethanonaphthalene; dimethyl dichlorovinyl phosphate; 4-chlorophenyl-4-chlorobenzene-sulfonate; and benzene hexachloride, as an essential active ingredient, a stabilizing amount of a water-insoluble chlorinated paraffin wax having 18–36 carbon atoms in the molecule thereof and containing 40–80% by weight of chemically combined chlorine and a carrier, which carrier is chemically inert with respect to said pesticidal material.

4. The composition as claimed in claim 3 wherein the active ingredient is 1,1,1 - trichloro - 2,2' - di(p-chlorophenyl)ethane.

5. The composition as claimed in claim 3 wherein the active ingredient is 1,2,3,4,10,10 - hexachloro - exo - 6,7-epoxy - 1,4,4a,5,6,7,8,8a - octahydro - 1,4,5,8-endo-endo-dimethanonaphthalene.

6. The composition as claimed in claim 3 wherein the active ingredient is 1,2,3,4,10,10 - hexachloro - exo-6,7-epoxy - 1,4,4a,5,6,7,8,8a - octahydro - 1,4 - endo-exo-4,8-dimethanonaphthalene.

7. The composition as claimed in claim 3 wherein the active ingredient is dimethyl dichlorovinyl phosphate.

8. The composition as claimed in claim 3 wherein the active ingredient is O,O-diethyl-O-p-nitrophenyl phosphorothioate.

9. The composition as claimed in claim 3 wherein the active ingredient is S-(1,2-dicarbethoxyethyl)-O,O-dimethyl phosphorodithioate.

10. The composition as claimed in claim 3 wherein the active ingredient is 4 - chlorophenyl - 4 - chlorobenzenesulfonate.

11. The composition as claimed in claim 3 wherein the active ingredient is benzene hexachloride.

12. A biologically active composition comprising in combination, at least 40% by weight of the total composition of a finely-divided inert carrier, up to 50% by weight of the total composition of a chlorinated paraffin wax having 18–36 carbon atoms in the molecule thereof and containing 40–80% by weight of chemically combined chlorine, and the remainder being a pesticidal material selected from the group consisting of 1,1,1-trichloro-2,2'-di(p-chlorophenyl)ethane; O,O - diethyl - O - p - nitrophenyl phosphorothioate; S - (1,2 - dicarbethoxyethyl)-O,O - dimethyl phosphorodithioate; 1,2,3,4,10,10 - hexachloro - exo - 6,7 - epoxy - 1,4,4a,5,6,7,8,8a - octahydro-1,4,5,8 - endo,endo-dimethanonaphthalene; 1,2,3,4,10,10-hexachloro - exo - 6,7 - epoxy - 1,4,4a,5,6,7,8,8a - octahydro - 1,4 - endo,exo - 4,8 - dimethanonaphthalene; dimethyl dichlorovinyl phosphate; 4 - chlorophenyl - 4 - chlorobenzenesulfonate; and benzene hexachloride.

13. The composition as claimed in claim 12 wherein there is also present a small amount of an organic wetting agent.

14. The composition as claimed in claim 12 wherein the pesticidal material and the chlorinated paraffin wax are present in about equal parts by weight.

References Cited in the file of this patent

UNITED STATES PATENTS

| | | |
|---|---|---|
| 2,423,457 | Lynn et al. | July 8, 1947 |
| 2,444,154 | Cross | June 29, 1948 |
| 2,760,900 | Glenn et al. | Aug. 28, 1956 |
| 2,786,012 | McHan | Mar. 19, 1957 |
| 2,809,147 | Hornstein et al. | Oct. 8, 1957 |
| 2,819,198 | Goodhue | Jan. 7, 1958 |
| 2,821,500 | Jackson et al. | Jan. 28, 1958 |

UNITED STATES PATENT OFFICE
CERTIFICATE OF CORRECTION

Patent No. 2,996,426                                        August 15, 1961

Arthur L. Galloway

It is hereby certified that error appears in the above numbered patent requiring correction and that the said Letters Patent should read as corrected below.

Column 3, Table I, column 2, line 13 thereof, for "7.5" read -- 7.5% --; column 4, line 19, for "chlarinated" read -- chlorinated --.

Signed and sealed this 19th day of December 1961.

(SEAL)
Attest:

ERNEST W. SWIDER                                  DAVID L. LADD
Attesting Officer                                  Commissioner of Patents

USCOMM-DC